Sept. 26, 1967 E. W. SANTOS 3,343,722
AUTOMATIC INJECTING DEVICE
Filed July 14, 1965 2 Sheets-Sheet 1
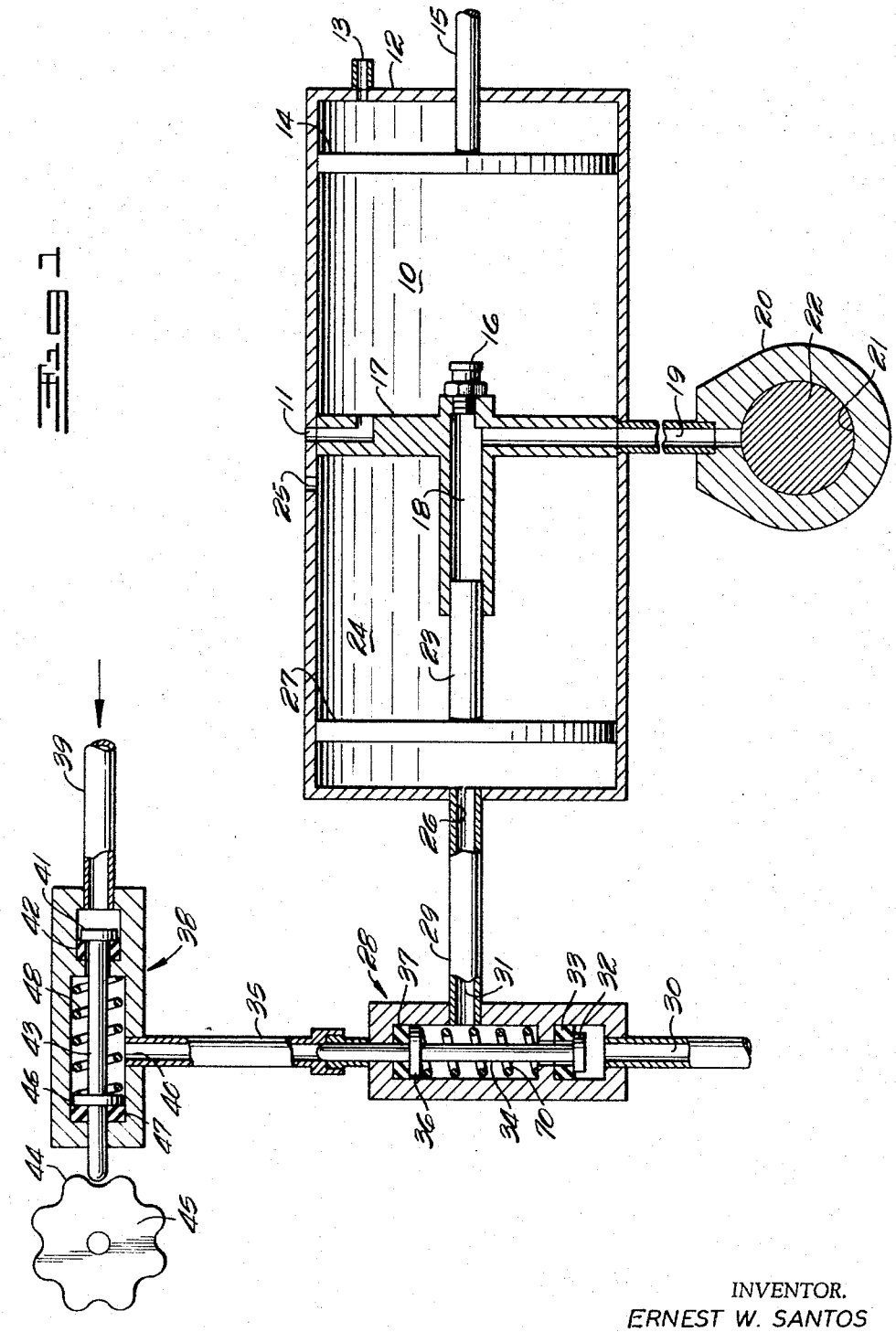
INVENTOR.
ERNEST W. SANTOS
BY
Jerome R. Cox
ATTORNEY

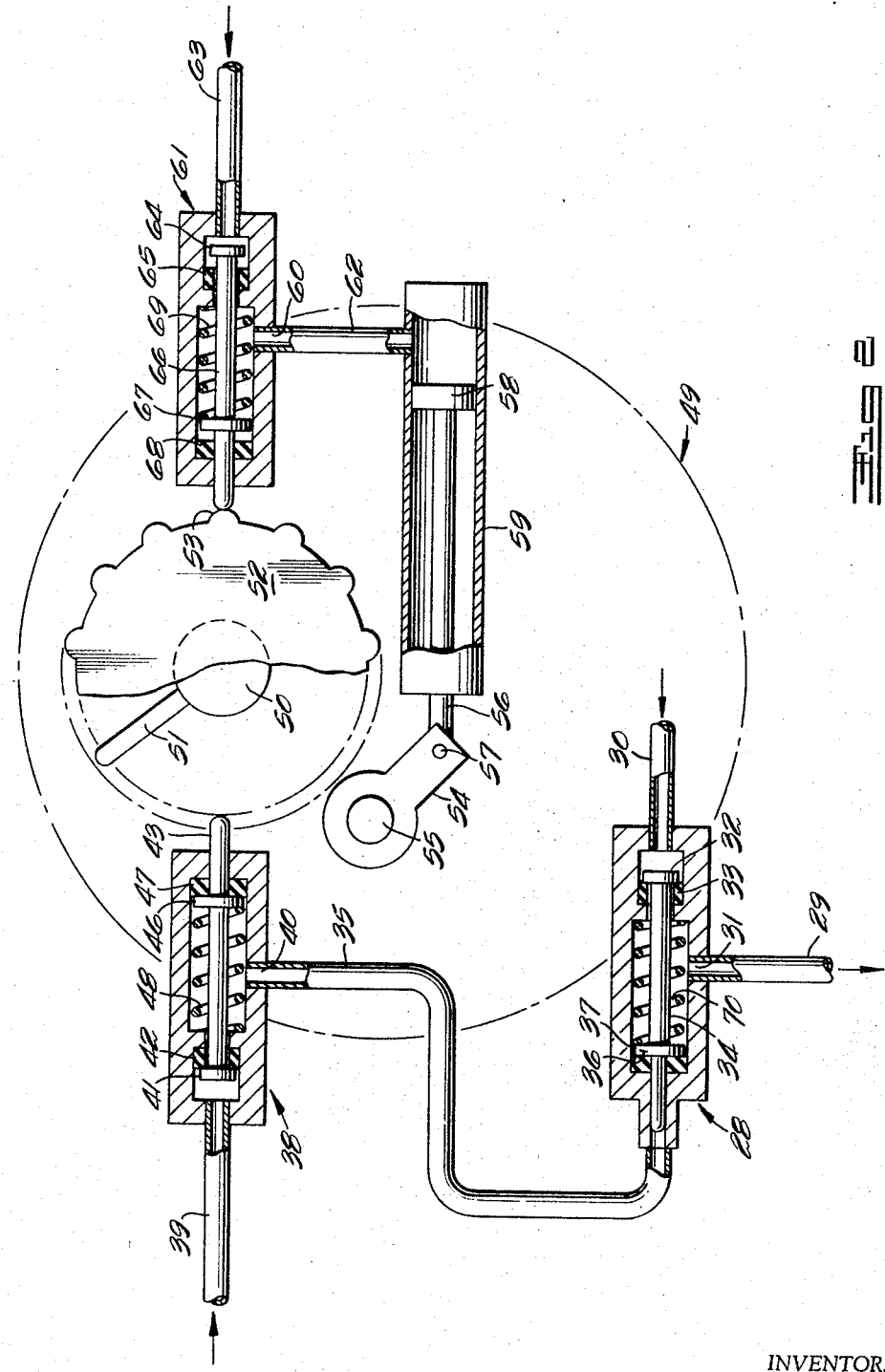

United States Patent Office 3,343,722
Patented Sept. 26, 1967

3,343,722
AUTOMATIC INJECTING DEVICE
Ernest W. Santos, Belleville, Ohio
(378 Best St., San Leandro, Calif. 94577)
Filed July 14, 1965, Ser. No. 471,887
16 Claims. (Cl. 222—70)

This invention deals with a device for the automatic and periodic delivery of a measured quantity of a fluid to a selected site or receptor. More particularly, the invention deals with a device which automatically, and at selected time intervals, injects a measured quantity of a lubricant, such as grease, into a valve, into a machine, against a bearing surface for a moving part, or other receptor requiring periodic lubrication. The invention also deals with a device of the character described in which the timing mechanism is self-winding.

There are many machines, particularly those which are large and costly, which require periodic lubrication. It has been the practice in many shops to assign a man to manually grease or oil such machines at periodic intervals, for example, once a day. Similarly, there are other devices which may require the periodic supply of a fluid. For example, steam boilers are frequently supplied with anti-rust agents which are periodically put into the water of the boiler. Further, and by the way of example, there are many chemical reactions carried out either continuously or in batch processing which require the periodic supply of catalytic agents, acids or alkalies for pH adjustment, and the like. Many of these requirements involve expensive equipment and expensive processing and therefore their effective carrying out should not be left to chance or to the memory of an individual.

Pumps, valves, and the like operating in a remote location where there is no electricity with which to run an electric timer present a unique problem in that spring operated clocks may run down and leave an automatic device inoperable. This has proven to be the case with pumps and valves in oil and gas lines passing through remote areas.

It is therefore an object of my invention to provide a device for automatically injecting a selected measured quantity of a fluid at selected time intervals into a receptor which receptor may be a machine, a chemical reaction vessel, a boiler, or other site requiring such fluid.

It is a particular object of my invention to provide an automatic lubricating device such as an automatic grease gun which will, at selected time intervals, eject a measured quantity of lubricant, e.g. grease, for delivery to a selected site.

It is a further object of my invention to avoid manual labor, as well as the normal carelessness and forgetfulness of human beings, in operations involving the periodic supply of fluids to a receptor device requiring such fluid.

It is a specific object of the invention to provide a device for automatically injecting a selected measured quantity of a fluid at selected time intervals in which said object comprises, as a timing device, a clock mechanism which periodically winds itself.

The foregoing and related objects can be attained in a device which comprises a reservoir for the fluid involved and a cooperating cylinder in which a measured quantity of fluid is stored. The measuring cylinder, when emptied following a periodic actuation of the device, is filled with fluid from the reservoir by movement of a spring or by movement of a piston movable in response to air pressure or the like. The fluid thus stored in the measuring cylinder is ejected by means of a piston, by a pump, or by other pressure developing means which can be actuated by a control means such as for example a timing mechanism.

Thus, I have provided a device for automatically injecting into a receptor in fluid communication therewith a selected measured quantity of a selected fluid at selected intervals of time by the periodic development in said device of a pressure greater than the pressure in said receptor, said device comprising: (1) a reservoir cylinder in which to store said selected fluid, said cylinder provided in a first wall thereof with an inlet port through which to supply said selected fluid to said device and provided in a second wall thereof, oppositely disposed to said first wall, with a fluid pressure port; (2) a piston mounted for movement in said reservoir cylinder between said inlet port and said fluid pressure port, being actuated for upstroke movement by the flow of said selected fluid through said inlet port and being actuated for downstroke movement by said fluid pressure; (3) a check valve positioned in a wall of said cylinder on the downstroke side of said piston and adapted for the transfer of said selected fluid out of said cylinder in response to downstroke movement of said piston; (4) a chamber of selected volume provided with a discharge port, said chamber being in fluid communication with said cylinder via said check valve and in fluid communication with said receptor via said discharge port, said chamber to be maintained at a pressure such that, when empty, it will be filled with said selected fluid via said check valve from said cylinder in response to downstroke movement of said piston; (5) timing means which is broadly a control means; and (6) means actuated by said timing means at selected time intervals for increasing the pressure on said selected fluid in said chamber to a pressure greater than the pressure in said fluid pressure port and to a pressure greater than the pressure in said receptor to effect the ejection of said selected fluid from said chamber via said discharge port into said receptor.

The clock of the invention includes a self-winding feature wherein the clock is wound by the development of pressure in the same manner as the development of pressure for the ejection of fluid. Thus, in a clock which comprises a winding mechanism and a rotor, the rotation of said rotor being responsive to means cooperative with said winding mechanism; I have provided the improvement which comprises: (1) A piston rod engaged with said mechanism in a manner such that downstroke movement of said rod winds said mechanism and such that unwinding of said mechanism effects upstroke movement of said rod; (2) a piston secured to said piston rod; (3) a fluid pressure-delivering valve adapted, when opened, to effect an increase in pressure on said piston; (4) actuating means adapted to open said valve; and (5) an arm secured to said rotor and extending radially outwardly therefrom adapted to periodically engage said valve actuating means: and wherein said arm periodically engages said actuating means, the latter then opens said valve, the pressure thereby developed effects the downstroke movement of said piston and piston rod, and the downstroke movement of said rod winds said mechanism.

Other objects and features of my invention will be apparent from a reading of this specification and the appended claims and from a consideration of the accompanying drawings in which one embodiment of the invention is described.

In the drawings:

FIG. 1 is a cross sectional view of an automatic grease gun embodying features of the present invention.

FIG. 2 is a cross sectional view of the self winding timing mechanism of the invention.

Referring more particularly to the drawings, grease is stored in a first cylinder or reservoir 10, which is provided with an inlet port 11 through which the reservoir 10 may be filled with grease as required. The wall 12 of the reservoir 10, at a point oppositely disposed to the inlet port 11, is provided with a fluid pressure port 13. A piston 14 is mounted for movement in the reservoir cylinder 10 between the inlet port 11 and the fluid pressure port 13. A piston rod 15 secured to the piston 14 serves to prevent the piston from going askew in the reservoir and also serves as an indicator of the volume of grease remaining in the reservoir 10.

A check valve 16 is positioned in the reservoir cylinder wall 17 on the downstroke side of the piston 14 (to the left as shown) and permits the passage of grease out of the reservoir 10 but not back into the reservoir.

The check valve 16 is in fluid communication with a measuring cylinder 18, the latter being provided with a lubricant discharge port 19. The lubricant discharge port 19 is attached, in fluid communication, to a receptor 20 for the lubricant. The receptor, as shown, is a bearing surface 21 supporting a moving shaft 22 but which may be any of a wide variety of lubricant requiring receptors.

A piston 23 is mounted for movement in the measuring cylinder 18, the length of the stroke of the piston 23 and the diameter of the measuring cylinder 18 being selected to give the desired volume of lubricant to be ejected from the device via the discharge port 19. The piston 23 in the measuring cylinder 18 is actuated for upstroke movement by the pressure of grease entering the measuring cylinder via the check valve 16. The piston 23 is periodically actuated for downstroke movement in a manner to be hereinafter described.

The measuring cylinder 18 is enclosed coaxially within a larger cylinder 24, the latter being provided with a port 25, whereby atmospheric pressure is maintained in a portion of said cylinder, and is provided with a high pressure port 26 whereby a periodically developed high pressure (that is; greater than atmospheric) is introduced into said large cylinder 24. A piston 27 is mounted for movement in the large cylinder 24 between said atmospheric pressure port 25 and said high pressure port 26. The piston 27 is secured to the measuring cylinder piston 23 for simultaneous movement therewith, upstroke movement of the piston 27 being in response to upstroke movement of the measuring cylinder piston 23 and downstroke movement of the piston 27 being in response to a periodically developed high pressure via the high pressure port 26.

The high pressure port 26 is in fluid communication with an on-off fluid pressure valve 28 which when actuated develops a relatively high pressure via fluid line 29 in said high pressure port 26. The valve 28 is in fluid communication with a source (not shown) of high fluid pressure via inlet line 30 and is provided with a high fluid pressure outlet 31 in fluid communication with high pressure port 26 via line 29. Valve 28 is normally closed, a valve 32 being normally seated, when closed, against a valve seat 33. The valve 32 is secured to a rod 34 which is movable downwardly (as shown) responsive to a suitable increase in pressure in line 35. A sealing ring 36, secured circumferentially to the rod 34 and engaging packing 37 compresses a spring 70 upon downward movement of the rod 34, the spring 70 holding the valve 28 normally closed.

A valve 38 is in fluid communication with a source (not shown) of high pressure fluid via inlet line 39 and is provided with a high fluid pressure fluid outlet 40, the latter being in fluid communication with the valve 28 via line 35. Valve 38 is normally closed, a valve 41 being normally seated against a valve seat 42. The valve 41 is secured to a rod 43 which is movable to the right (as shown) responsive to periodic engagement with lugs, such as lug 44, which form a part of the periphery of a rotor 45 of an electric timer (not shown). A sealing ring 46, secured circumferentially to the rod 43 and engaging packing 47, compresses a spring 48 upon movement of the rod 43 to the right (as shown), the spring 48 holding the valve 38 normally closed.

FIG. 2 illustrates the self-winding timing mechanism of the invention and shows the valves 28 and 38 described in connection with FIG. 1 including the high pressure fluid line 29 which is in fluid communication with a fluid injecting device (not shown in FIG. 2) such as the automatic grease gun of FIG. 1.

A clock, indicated generally by 49, is provided with a rotor 50 to which is secured the radially extending arm 51 adapted to periodically engage the rod 43 of valve 38, thereby opening the valve 28. The clock 49 is also provided with a second rotor 52 to which is secured a plurality of peripheral lugs, such as lug 53.

The clock 49 is provided with a winding arm 54 wherein winding is effected by a partial revolution of the arm 54 in a clockwise direction (as shown) about a fixed axis 55 and wherein unwinding effects a partial revolution in a counter clockwise direction (as shown) about the fixed axis 55. The winding arm 54 is attached to a piston rod 56 by means of a pin 57 and the piston rod 56 is secured to the piston 58 housed in the cylinder 59. The cylinder 59 is in fluid communication with the high pressure outlet 60 of a valve 61 via line 62.

The valve 61, similar to valves 28 and 38 already described, is in fluid communication with a source (not shown) of high pressure fluid via inlet line 63 and is provided with a high pressure fluid outlet 60. Valve 61 is normally closed (but is illustrated in FIG. 2 as having just been opened), a valve 64 being normally seated against a valve seat 65. The valve 64 is secured to a rod 66 which is movable to the right (as shown) responsive to periodic engagement with the lugs, such as lug 53, of the rotor 52. A sealing ring 67, secured circumferentially to rod 66 and normally engaging packing 68, compresses a spring 69 upon movement of the rod 66 to the right (as shown), the spring 69 holding the valve 61 normally closed.

*Operation*

To operate the device shown in FIG. 1, grease is introduced into the cylinder reservoir 10 via the inlet port 11 under pressure. The pressure of the incoming grease causes the reservoir piston 14 to move to the right (as shown). When the cylinder reservoir 10 is full of grease, the piston 14 is at the extreme right of the cylinder 10. A fluid pressure, such as air pressure, is supplied to the other side of the piston 14 via the fluid pressure port 13. The pressure in the latter port is maintained by an air compressor or the like (not shown) at a pressure sufficient to cause movement of the piston 14 to the left and the passage of grease through the check valve 16 into the measuring cylinder 18 unless this latter cylinder is already full. This pressure, however, is not raised to a level where it would cause grease to be ejected from the discharge port 19 of the measuring cylinder 18. When the timer 45 has moved one of the lugs 44 to a point where it can engage the rod 43 of valve 38, the valve opens and a fluid pressure is developed in line 35 leading to the relatively higher fluid pressure valve 28. The pressure in line 35 moves rod 34 of valve 28 downward (as shown), valve 28 opens, and a relatively high fluid pressure is transmitted via the high pressure port 26 to the piston 27 in the large cylinder 24. The resulting downstroke of the piston 27 effects a simultaneous downstroke of the measuring cylinder piston 23 which, in turn, effects the ejection of the grease out of the measuring cylinder 18 via the discharge port 19. When the further movement of the timer causes a relaxation of pressure on the rod 43, the valves 28 and 38 shut off in turn and relax the pressure on the piston 27. The relaxation of the pressure may be complemented or speeded up, if desired, by the usual methods of the art (such as provision of suitable small pin holes, reliance on leakage in the valves, use of three way valves, etc.). The pressure at the pressure port 13 then becomes dominant and moves the piston 14 to the left, thus forcing grease into the measuring cylinder 18 and causing the pistons 23, 27 to move again to the left.

The invention has been described in FIG. 1 with particular reference to a lubrication device, specifically an automatic grease gun. However, the device has been used for the periodic ejection of anti-rust agents into a steam boiler, and could serve equally well for the periodic supply of other fluids, such as, for example, catalysts or modifying agents to polymerization reaction systems.

The receptor device 20 shown in the drawing would exert no significant back pressure on the discharge port 19. Many receptors do, however, exert a considerable back pressure. This is true of grease-containing devices wherein it is necessary to force old grease out of the receptor while forcing new grease in. This, however, poses no problem to the device of my invention since it is merely necessary to provide a suitably high pressure via the valve 28 or an equivalent time actuated pump (not shown). Similarly pressure at the pressure port 13 is readily adjustable to provide for flow of grease into the measuring cylinder 18.

Although two fluid valves 28, 38 are shown in series in the drawings and this represents a preferred embodiment, advantages of the invention may be attained by the use of a properly selected single valve. The use of two valves in series, such as valves 28, 38, effects, when the valves are open, a uniform progressive movement of the piston 27 to the right as opposed to a "chattering" or jerky movement of the piston 27 when a single valve is used. The valve arrangement may also be replaced by a reciprocating pump which, when time actuated, pumps grease or other selected fluid from the measuring chamber.

As shown in FIG. 2, the type of periodic actuation used in connection with the grease gun of FIG. 1 can also be used as a self winding mechanism for a timer in those uses where electricity is not available. I have found, for example, that many valves and pumps used with oil and gas lines are located in remote areas where electricity is not available. Thus as the clock 49 unwinds, the rotor 50 rotates and periodically effects the engagement of arm 51 with rod 43 of the valve 38 in the manner already described. Similarly, however, as the clock 49 unwinds, the rotor 52 rotates and effects the engagement of a lug, such as lug 53, with rod 66 of valve 61. Pressure on the rod 66 causes it to move to the right (as shown) and to open valve 61 thus transmitting a high fluid pressure to line 62. This latter pressure is transmitted to the cylinder 59 and causes the piston 58 and the piston rod 56 to move to the left. Movement of the piston rod 56 to the left effects a partial clockwise turn to the clock winding arm 54. In this manner, the clock is periodically rewound. As the clock unwinds, the winding arm moves partially counterclockwise to return the piston 58 to its original position.

It is to be understood that the above described embodiments of my invention are for the purpose of illustration only, and various changes may be made therein without departing from the spirit and scope of the invention which is defined in the accompanying claims.

I claim:

1. A device for automatically injecting into a receptor in fluid communication therewith a selected measured quantity of a selected fluid at selected intervals of time by the automatic periodic development in said device of a pressure greater than the pressure in said receptor, said device comprising: a cylinder having a uniform diameter substantially throughout its length and having a partition intermediate its ends and providing:

(1) a reservoir in which to store said selected fluid, said reservoir being provided in one end of said cylinder and being provided with an inlet port formed in said partition through which to supply said selected fluid to said device;

(2) a chamber of selected volume provided in a hollow cylindrical extension of said partition positioned concentrically in said cylinder and being in fluid communication with said reservoir and in fluid communication with said receptor;

(3) means for automatically refilling said chamber from said reservoir each time said chamber is emptied;

(4) control means; and (5) pressure increasing means periodically actuatable by said control means to increase the pressure on said fluid in said chamber and to effect the ejection of said fluid from said chamber said pressure increasing means including a cylindrical piston positioned in said hollow cylindrical extension and also concentric in said cylinder.

2. A device for automatically injecting into a receptor in fluid communication therewith a selected measured quantity of a selected fluid at selected intervals of time by the automatic periodic development in said device of a pressure greater than the pressure in said receptor, said device comprising:

(1) a reservoir cylinder in which to store said selected fluid, said cylinder provided in a first wall thereof, with an inlet port through which to supply said selected fluid to said device and provided in a second wall thereof, oppositely disposed to said first wall, with a fluid pressure port;

(2) a piston mounted for movement in said reservoir cylinder between said inlet port and said fluid pressure port, being actuated for upstroke movement by the flow of said selected fluid through said inlet port and being actuated for downstroke movement by said fluid pressure;

(3) a check valve positioned in a wall of said cylinder on the downstroke side of said piston and adapted for the transfer of said selected fluid out of said cylinder in response to downstroke movement of said piston;

(4) a chamber of selected volume provided with a discharge port, said chamber being in fluid communication with said cylinder via said check valve and in fluid communication with said receptor via said discharge port, said chamber adapted to be maintained at a pressure relative to the pressure in said reservoir such that, when empty, it will be filled with said selected fluid via said check valve from said cylinder in response to downstroke movement of said piston;

(5) timing means; and (6) means actuated by said timing means at selected time intervals for increasing the pressure on said selected fluid in said chamber to a pressure greater than the pressure in said receptor to effect the ejection of said selected fluid from said chamber via said discharge port into said receptor.

3. The device according to claim 2 wherein the selected fluid is a lubricant.

4. The device according to claim 2 wherein the selected fluid is grease.

5. The device according to claim 2 wherein the selected fluid is a lubricating oil.

6. The device according to claim 2 wherein the selected fluid is an anti-corrosion agent.

7. The device according to claim 2 wherein said fluid pressure port is an air pressure port.

8. The device according to claim 2 wherein said chamber of selected volume is a cylinder wherein a piston is positioned for upstroke movement in response to movement of said selected fluid through said check valve and for downstroke movement in response to said pressure increasing means.

9. The device according to claim 2 wherein said pressure increasing means is an on-off fluid valve actuated by said timing means and said chamber of selected volume is a cylinder wherein a piston is positioned for upstroke movement in response to movement of said selected fluid through said check valve and for downstroke movement in response to pressure exerted via said fluid valve when in the on position.

10. The device according to claim 2 wherein said pressure increasing means is a pump.

11. The device according to claim 2 wherein said pressure increasing means comprises a pilot fluid valve actuated by said timing means and a second fluid valve actuated by said pilot fluid valve to increase the pressure on the selected fluid in said chamber.

12. A device for automatically injecting into a receptor in fluid communication therewith a selected measured quantity of a fluid lubricant at selected intervals of time by the periodic development in said device of a pressure greater than the pressure in said receptor, said device comprising:

(1) a first cylinder in which to store said lubricant, said first cylinder provided in a wall thereof with an inlet port through which to supply said lubricant to said device and provided in a second wall thereof, oppositely disposed to said first wall, with a fluid pressure port;

(2) a first piston mounted for movement in said first cylinder between said inlet port and said fluid pressure port, being actuated for upstroke movement by the flow of said lubricant through said inlet port and being actuated for downstroke movement by said fluid pressure;

(3) a check valve positioned in a wall of said first cylinder on the downstroke side of said first piston and adapted for the transfer of said lubricant out of said first cylinder in response to downstroke movement of said piston;

(4) a timing means;

(5) a first valve adapted for periodic actuation by said timing means to develop an outlet fluid pressure;

(6) a second valve adapted to be activated by the outlet fluid pressure of said first valve to develop a relatively larger outlet fluid pressure;

(7) a second cylinder provided on a wall thereof with an opening to the atmosphere and provided on another wall thereof with a high pressure port in fluid communication with said outlet of said second valve;

(8) a second piston mounted for movement in said second cylinder between said opening and said high pressure port, said second piston being actuated for downstroke movement by said periodic development of high pressure;

(9) a third cylinder positioned coaxially within said second cylinder and provided with a discharge port, said third cylinder being in fluid communication with said first cylinder via said check valve and in fluid communication with said receptor via said discharge port and said third cylinder to be maintained at a pressure such that, when empty, it will be filled with said lubricant via said check valve from said first cylinder in response to downstroke movement of said first piston;

(10) a third piston mounted for movement in said third cylinder, the length of stroke of said piston and the diameter of said third cylinder being selected to provide a desired volume, said third piston being secured to said second piston for simultaneous movement therewith, said third piston being actuated for upstroke movement by the flow of lubricant through said check valve and being actuated for downstroke movement by downstroke movement of said second piston, and wherein said downstroke movement of said third piston ejects said lubricant from said third cylinder into said receptor via said discharge port.

13. In a clock which comprises a winding mechanism and a rotor, the rotation of said rotor being responsive to means cooperative with said winding mechanism, the improvement which comprises:

(1) a piston rod engaged with said mechanism in a manner such that downstroke movement of said rod winds said mechanism;

(2) a source of high pressure fluid;

(3) a piston secured to said piston rod;

(4) a valve adapted, when opened, to effect fluid communication between said source of high pressure fluid and said piston to effect an increase in pressure on said piston;

(5) actuating means adapted to open said valve; and (6) an arm secured to said rotor and extending radially outwardly therefrom adapted to periodically engage said valve actuating means; and wherein said arm periodically engages said actuating means, the latter then opens said valve, the pressure thereby developed effects the downstroke movement of said piston and said piston rod, and the downstroke movement of said rod winds said mechanism.

14. A self winding clock-actuated device for automatically injecting into a receptor in fluid communication therewith a selected measured quantity of a selected fluid at selected intervals of time by the automatic periodic development in said device of a pressure greater than the pressure in said receptor; said device comprising:

(1) a reservoir in which to store said selected fluid, said reservoir being provided with an inlet port through which to supply said selected fluid to said device;

(2) a chamber of selected volume in fluid communication with said reservoir and in fluid communication with said receptor;

(3) means for automatically refilling said chamber from said reservoir each time said chamber is emptied;

(4) timing means comprising a winding mechanism and a rotor, the rotation of said rotor being responsive to means cooperative with said mechanism;

(5) a piston rod engaged with said mechanism in a manner such that downstroke movement of said rod winds said mechanism;

(6) a piston secured to said rod;

(7) a source of high pressure fluid;

(8) a valve adapted, when opened, to effect fluid communication between said source of high pressure fluid and said piston to effect an increase in pressure on said piston;

(9) actuating means adapted to open said valve;

(10) an arm secured to said rotor and extending radially outwardly therefrom and adapted to periodically engage said value actuating means; and

(11) pressure increasing means in fluid communication with said source of high pressure fluid and periodically actuatable by said timing means to increase the pressure on said fluid in said chamber and to effect the ejection of said fluid from said chamber;

wherein said arm periodically engages said actuating means, the latter then opens said valve, the pressure thereby made available effects the downstroke movement of said piston and said piston rod, and the downstroke movement of said rod winds said mechanism.

15. A device for injecting into a receptor which is in fluid communication with said device, a selected measured quantity of a selected fluid at selected times by the development in said device of a pressure greater than the pressure in said receptor, said device comprising:

(1) a substantially cylindrical container formed with substantially closed ends;

(2) a partition positioned in said container intermediate said ends and formed with an inlet bore by which a supply of said selected fluid may be delivered to a reservoir in the interior of said container on one side of the partition, formed with an outlet bore by which a measured quantity of said selected fluid may be delivered to said receptor, formed with a hollow cylindrical extension extending within said container in a direction at right angles to said partition and opposite to said reservoir, and provided with a one-way check valve allowing the flow of said selected fluid into the hollow of said cylindrical extension and into the outlet bore which is connected to said hollow to replenish the hollow of said hollow cylindrical extension after the selected fluid has been delivered from said hollow to the receptor;

(3) a small sized piston in the hollow of said cylindrical extension;

(4) a large sized piston in the portion of said cylindrical container which is separated by said partition from said reservoir, being relatively much larger than the small sized piston and operatively connected to the small sized piston; and (5) means for controllably supplying fluid under pressure to the end of said container opposite to said reservoir for exerting pressure on said large sized piston and through the small sized piston exerting increased pressure on the selected fluid to deliver it to the receptor.

16. In a clock which comprises a clock motor which is energized by a winding mechanism, a rotor, the rotation of said rotor being responsive to the operation of said clock motor, the improvement which comprises:

Fluid means for actuating said winding mechanism including (1) a piston rod engaged with said winding mechanism in a manner such that the working stroke movement of said piston rod winds said winding mechanism;

(2) a piston secured to said piston rod;

(3) a fluid cylinder in which said piston rod and piston are positioned;

(4) a source of high fluid pressure;

(5) a fluid connection between said source of high fluid pressure and said cylinder;

(6) a valve in said connection adapted when opened to effect fluid communication between said source of high fluid pressure and said cylinder to effect an increase in pressure on said piston;

(7) actuating means adapted to open said valve; and (8) at least one lug secured to said rotor and extending radially outwardly therefrom adapted to periodically engage said valve actuating means;

wherein said lug periodically engages said actuating means, the actuating means then opens said valve, the pressure thereby developed effects the working stroke movement of said piston and piston rod, and the working stroke movement of said rod effects the energization of said winding mechanism.

References Cited
UNITED STATES PATENTS

| | | | |
|---|---|---|---|
| 1,751,693 | 3/1930 | Gentle | 222—387 |
| 2,140,679 | 12/1938 | McKeever | 222—334 |
| 3,085,715 | 4/1963 | Douglas | 222—389 X |
| 3,145,803 | 8/1964 | Cobert | 222—70 X |
| 3,180,527 | 4/1965 | Wasilewski et al. | 222—70 |

ROBERT B. REEVES, *Primary Examiner.*

N. L. STACK, *Assistant Examiner.*